United States Patent
Klimesch (10) Patent No.: US 10,436,628 B2
(45) Date of Patent: Oct. 8, 2019

(54) METHOD FOR CALIBRATING A DISPLAY OF A FILLING LEVEL

(71) Applicant: AUDI AG, Ingolstadt (DE)

(72) Inventor: Michael Klimesch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 163 days.

(21) Appl. No.: 15/805,260

(22) Filed: Nov. 7, 2017

(65) Prior Publication Data

US 2018/0143065 A1    May 24, 2018

(30) Foreign Application Priority Data

Nov. 21, 2016    (DE) .................. 10 2016 222 849

(51) Int. Cl.
    *G01F 25/00*    (2006.01)
    *G01F 23/00*    (2006.01)
    *G01F 23/30*    (2006.01)
    *G01F 23/32*    (2006.01)

(52) U.S. Cl.
    CPC ...... *G01F 25/0069* (2013.01); *G01F 23/0076* (2013.01); *G01F 23/30* (2013.01)

(58) Field of Classification Search
    CPC ........ G01F 23/36; G01F 23/32; G01F 23/363; G01F 23/0069; G01F 23/30; G01F 23/64; F17C 2250/0413
    See application file for complete search history.

(56) References Cited

U.S. PATENT DOCUMENTS

| | | | | |
|---|---|---|---|---|
| 2,350,042 | A * | 5/1944 | Jurs .................. | G01F 23/34 73/318 |
| 2,508,290 | A * | 5/1950 | Poetsch ............. | G01F 23/36 338/33 |
| 3,529,472 | A * | 9/1970 | Riddel ............... | G01F 23/246 73/295 |

(Continued)

FOREIGN PATENT DOCUMENTS

| | | |
|---|---|---|
| CN | 105229431 A | 1/2016 |
| DE | 19725672 A1 | 12/1998 |

(Continued)

OTHER PUBLICATIONS

German Search Report dated Sep. 6, 2017 from corresponding German Application No. 102016222849.8 (10 pages).

(Continued)

*Primary Examiner* — David A Rogers
(74) *Attorney, Agent, or Firm* — Maier & Maier, PLLC (57) ABSTRACT

A method for adaptive calibration of a fuel level indicator of a filling level of a liquid in a tank accompanying operations. A filling level of the liquid is detected with a sensor arrangement. A sensor signal of the arrangement is provided during a movement of the vehicle. In case that the course of the sensor signal is obtained in a respective defined time interval in which the sensor signal is provided several times, a constant value is assumed, an end stop is detected. The respective time intervals at which the end stops were detected and the respective associated constant values are stored. A minimum number of end stop is defined for the tank, and in the case that the minimum number of end stops is reached, a calibration phase is carried out.

10 Claims, 6 Drawing Sheets

(56) References Cited

U.S. PATENT DOCUMENTS

| | | | | |
|---|---|---|---|---|
| 3,563,091 | A * | 2/1971 | Riddel | G01F 23/246 73/295 |
| 3,786,464 | A * | 1/1974 | Staempfli | G01F 23/44 340/623 |
| 3,925,747 | A * | 12/1975 | Woodward | B60K 15/061 338/33 |
| 4,220,047 | A * | 9/1980 | Mauboussin | G01F 23/36 338/33 |
| 4,939,932 | A * | 7/1990 | Ritzenthaler | G01F 23/32 338/33 |
| 5,085,078 | A * | 2/1992 | Baux | G01F 23/36 338/33 |
| 5,284,055 | A * | 2/1994 | Baux | G01F 23/36 338/33 |
| 5,383,359 | A | 1/1995 | Challoner et al. | |
| 5,666,851 | A * | 9/1997 | Bacon | G01F 23/36 338/33 |
| 5,941,122 | A * | 8/1999 | Nelson | G01D 5/2415 73/312 |
| 6,089,086 | A * | 7/2000 | Swindler | G01F 23/38 73/305 |
| 6,508,121 | B2 * | 1/2003 | Eck | G01F 23/32 338/33 |
| 6,990,862 | B2 * | 1/2006 | Bergsma | G01F 23/363 73/305 |
| 7,299,675 | B2 * | 11/2007 | Henschel | G01F 23/32 73/1.17 |
| 8,042,388 | B2 * | 10/2011 | Powell | G01F 23/0069 73/311 |
| 2002/0124647 | A1 * | 9/2002 | Hagiwara | G01F 23/603 73/305 |
| 2006/0137429 | A1 * | 6/2006 | Henschel | G01F 23/32 73/1.73 |
| 2010/0242597 | A1 * | 9/2010 | Powell | G01F 23/0069 73/311 |
| 2016/0097671 | A1 | 4/2016 | Faber et al. | |

FOREIGN PATENT DOCUMENTS

| | | |
|---|---|---|
| DE | 102004062100 A1 | 7/2007 |
| DE | 102007030992 A1 | 1/2009 |
| DE | 102008009154 A1 | 8/2009 |
| DE | 102010043936 A1 | 5/2012 |

OTHER PUBLICATIONS

Office Action dated Jun. 26, 2019, in corresponding Chinese Application No. 201711160471.9; 10 pages.

* cited by examiner

METHOD FOR CALIBRATING A DISPLAY OF A FILLING LEVEL

FIELD

The invention relates to calibrating a display of a filling level of a liquid which can be filled into a tank of a vehicle.

BACKGROUND

A vehicle is provided with at least one tank for storing a liquid which is required for operating the vehicle. At the same time, a sensor arrangement for determining a filling level of the liquid in the tank is associated with the tank. However, it should be taken into account that a system that comprises the tank as well as the sensor arrangement is subject to manufacturing tolerances as well as to changes occurring over the lifespan of the system. For that reason, it is usually the case that when the tank is almost full or almost empty, it is not always possible to ascertain an absolutely correct value of the filling level by means of the sensor arrangement and also to indicate this via a display device to the driver of the vehicle.

It is therefore necessary to provide tolerances in a region in which the tank is almost full, as well as in a region in which the tank is almost empty, when the tanking indicator is installed. If for example fuel is stored in the tank in advance for driving the motor vehicle, it is then possible for instance to prevent a situation when the vehicle stalls due to a lack of fuel.

The tolerances should in this case be set in such a way that the fuel level indicator reliably indicates that the tank is empty if the supply of fuel has been exhausted. The fuel level indicator must also indicate with reliability the status when the tank is full.

However, unfavorable characteristics of the fuel level indicator may occur as a result of preset and/or applied tolerances. So for example, it is possible that the fuel level indicator indicates that the tank is empty although there still are for example 3.5 to 5 liters of fuel in the tank. This amount of fuel is not visible to the driver, which creates an additional burden for the vehicle resulting in a lower traveling range.

In addition, the fuel gauge can also indicate that the tank is full even though this is not the case. In general, the fuel gauge does not indicate the real filling level in a linear manner.

From document DE 10 2007 030 992 A1 is known a method for detecting a fuel filling level in a tank of a motor vehicle with an internal combustion engine. In this case, a fuel filling level sensor signal is determined by a fuel filling level sensor. In addition, a calculated fuel filling level is determined as a function of a fuel amount that is consumed by the internal combustion engine. A corrected fuel level signal is thus provided depending on the fuel filling level signal and the calculated fuel filling level.

A method for monitoring a digital fuel filling level sensor for a tank that is subjected to movements is described in the document DE 10 2008 009 154 A1. In this case, occurrences of sloshing at a filling height around a sensor position in the tank are used to arrive at a conclusion about a functional capability of tank filling sensor.

In the document 10 2010 043 936 A1 is described a method for determining the filling level of a movable tank. This method comprises discrete pins provided with filling level sensors arranged at different filling levels, so that sensor signals obtained from pins arranged at different heights are interpolated and filtered to provide a quasi-continuous signal. In this case, sloshing zones are defined around the pins, within which sloshing of the liquid stored therein occurs during the movement of the tank, so that the filling level can be inferred from the signal obtained during the occurrences of the sloshing events.

SUMMARY

Against this background, the object of this invention was to calibrate a fuel level indicator in an adaptive manner.

The method according to the invention is provided for an adaptive calibration of a fuel level indicator of a filling level of a liquid, which can be filled into a tank of a vehicle used for operating the vehicle. In this case, a filling level of the liquid is detected with a sensor arrangement, by means of which a sensor signal is provided and/or generated which indicates the filling level. The sensor signal has a periodic course during the movement of the vehicle and thus provides a periodic course with a frequency and with an amplitude. If the course of the sensor assumes and/or exhibits a value that is constant or unchanged in time, an end stop is detected by the sensor arrangement. During the procedure, the points in time at which end stops occur are detected and the associated resulting constant values are stored. A minimum number of end stops is or are thus defined for the tank and/or for the sensor arrangement. If the minimum number of end stops is reached, a calibration phase is carried out, during which the constant values resulting from the end stops are statistically evaluated, so that a calibration value is determined from these constant values by means of which the display of the filling level is calibrated.

According to an embodiment, the calibration phase begins as soon as the speed of the vehicle is more than zero, and the sensor signal then assumes a periodic course when at least one component can be moved in the tank.

The filling level of the liquid can be detected with at least one component of a sensor arrangement, wherein the sensor signal results from a position of the at least one component within the tank. In an embodiment, the filling level of the liquid is detected with a sensor arrangement which detects at least one component of a float which floats on the surface of the liquid. In this case, the sensor arrangement provides a sensor signal resulting from a position of the float inside the tank, wherein the sensor signal has a periodic course during a movement of the vehicle. If the float touches an inner wall of the tank, an end stop is caused on the inner wall.

Furthermore, it is possible that the filling level of the liquid is detected in a capacitive manner by a sensor arrangement using ultrasound. A sensor signal is again provided with the sensor signal, which has a periodic course and which indicates an end stop when the course indicates a constant value.

The method is as a rule carried out for at least one end region of the filling level. In this case, a first end region corresponds to an empty zone of the filling level region when the constant values are smaller than a defined minimum value.

A second end region corresponds to a full zone of the filling level region, when the constant values, which are determined for the course of the sensor signal, are greater than a defined maximum value. In this case, at least one calibration phase is carried out for each end region because different calibration values can be taken into account for both end regions. In addition, a minimum number of end stops is defined, which is to say a minimum number of end stops for the empty range status, and a minimum number of end for the full range status is defined.

According to a first variant for statistical evaluation, an average value is calculated from all constant values resulting from the end stops, and an average value is calculated and used as a calibration value. In this case, a minimum number of values resulting from end stops is defined, usually both for the full range and for the empty range status, by means of the average value is formed and used.

According to a second variant for statistic evaluation, multiple value windows are defined for the constant values, which cover a range of the full filling level, wherein each value window is limited by a maximum value and by a minimum value, and wherein a reference value is assigned to each value window which corresponds for example to an average value between the maximum value and the minimum value. According to this variant, each detected end stop is assigned a value window based on a constant value that is assigned to it, wherein as a calibration value of the benchmark value is used the value window in which most constant values occur. Therefore, a minimum number of end stops is detected which are provided with significance, by means of which a significant calibration value is identified.

The calibration phase can be also carried out when the vehicle has traveled a minimum distance after the start of a trip. Furthermore, it can be eventually also provided that the calibration phase is carried out when a definable minimum time period has elapsed after the beginning of a trip. In this manner, at least one criterion can thus be defined as a condition for carrying out a calibration phase, as a rule the number of the end stops which can be defined for a respective end region, or a combination of criteria, for example up to three criteria, can be taken into account, wherein with a combination of at least two criteria, the definable minimum number of end stops and/or the respective minimum definable time period are taken into account.

In an embodiment, the minimum number of end stops is defined depending on the form of the tank.

At the same time, one form of the course of the sensor signal can be determined experimentally. As an alternative or in addition, the minimum number of end stops can be also determined. The minimum number can be at least 100 and up to 10,000 depending on the form of the tank.

In addition, the frequency and/or the amplitude of the course of the sensor signal can be also taken into account. Also in this case, the form of the course of the sensor signal and thus also its frequency and amplitude will depend on the form of the tank. At the same time, a minimum value and/or a maximum value can be provided for the amplitude as well as for the frequency, by means of which an end stop can be identified.

Usually, a calibration value that can be used by the fuel level indicator is adjusted after each calibration phase to the calibration value determined in this manner and thus updated.

Furthermore, the calibration value is used as an offset for the fuel level indicator, wherein the value of the filling level indicated by the fuel level indicator is derived from the value detected from the sensor signal plus the offset. In this case, the offset is added both in the empty region as well as in the full region.

In an embodiment, a first or initial calibration value is determined on the basis of a known amount of liquid contained in the tank, or for example in a factory.

The method can be applied to a tank, as a rule to a fuel level indicator which can be filled with a liquid and which is used during the operation of the vehicle, so that the tank can then be refilled later.

BRIEF DESCRIPTION

The invention is schematically illustrated and described in detail based on its embodiments with reference to the reference symbols shown in the figures.

DETAILED DESCRIPTION

The figures are described in a coherent and comprehensive manner, the same reference symbols are assigned to the same components.

Figure 1:
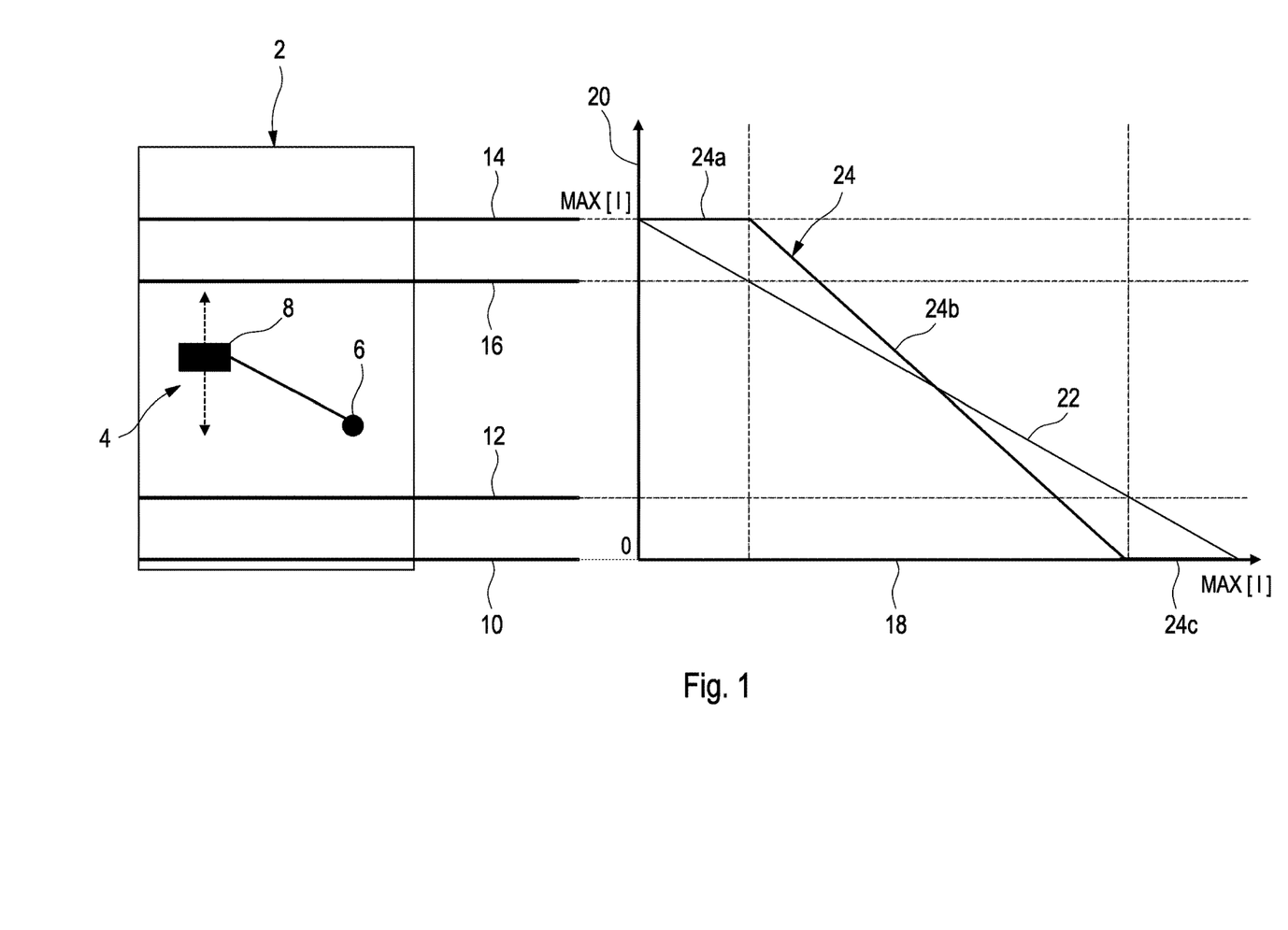
FIG. 1 shows a schematic view illustrating a tank with which an embodiment of the method according to the invention can be carried out, and a diagram of a fuel level indicator for this tank.

FIG. 1 shows in a schematic representation an example of a tank 2, which is arranged in a vehicle and which can be filled with a liquid, for example fuel, that is required for operating the vehicle. In this case the tank 2 comprises a sensor arrangement 4, which is provided with a lever-type sensor installed in a stationary manner in the tank, as well as a float 8 used as a component therein. In this case, the float 8 has a lower density than the density of the liquid which is located in the tank 2. As a result, the float 8 is as a rule always located on a surface of the liquid and accordingly, it moves along with the movements of the surface, which is indicated by two dashed arrows. This results in a movement of the liquid and thus also of the float 8 due to a movement of the vehicle and of the tank 2, as well as due to a change in the amount of the liquid in the tank 2, which occurs when the liquid is being consumed during the operation of the vehicle. The amount of the liquid in the tank 2 can further also change when new liquid is added to the tank 2. A first position line 10, a second position line 12, a third position line 14 and a fourth position line 16 are assigned to the tank 2 as shown also in the diagram.

The diagram of FIG. 1 includes a horizontal axis 18 and a vertical axis 20. A real value of a decrease of the volume of the liquid in the tank is plotted on the horizontal axis 18, while on the vertical axis 20 is plotted the value of the liquid indicated by the fuel level indicator. In this manner, the first position line 10 shows, with respect to the tank as well as in the diagram, that the tank 10 is completely emptied. However, a tolerance-empty zone is provided for the fuel level indicator, which is delimited by the first position line 10 and by the second position line 12. In this case, the fuel level indicator shows that the tank 2 is already emptied when the amount of the liquid corresponds to a maximum value which is indicated by the second position line 12.

The third position 14 corresponds to a value indicating the filling level in the tank 2 when the tank has been completely filled with a liquid. However, a tolerance-full zone is provided also here for the fuel level indicator, which is delimited by the third position line 14 and by the fourth position line 16. In this case, the fuel level indicator indicates that the tank 2 is full when the volume of the liquid in the tank 2 corresponds at least to a value that is indicated by the fourth position line 16. The tolerance-full zone as well as the tolerance-empty zone correspond in this case to a volume of approximately 3 to 5 liters.

In the diagram is also shown a curve 22 which indicates an ideal course of the fuel level indicator, wherein the amount shown by the fuel level indicator (indicated along the vertical axis) is proportional to the real amount of fuel (indicated along the horizontal axis). A second curve 24 shown in the diagram illustrates the real progress of the fuel level indicator. This curve 24 includes a first section 24a, which indicates that the tank 2 is completely filled (=MAX). At the same time, this is the case until the amount or the volume of the liquid corresponds at least to the amount that is indicated by the third position 16. A second section 24b of the curve 24 indicates values for the fuel level indicator when the amount of the fuel indicates the maximum value, which is marked by the third position line 16, and a minimum value, which is marked by the second position line 12. A third section 24c of the second curve 24 indicates a value for the fuel level indicator wherein the tank 2 is completely emptied, which, however, is already the case when the amount of the fuel in the tank 2 is at the most as large as the value that is indicated by the second position line 12.

During the production process of the vehicle it is provided that a wet calibration as well as a dry calibration are carried out for the fuel level indicator. In this case, the tank 2 is filled with a defined amount of fuel during the initial filling of the vehicle 2 with the liquid, and an actual position of the float 8, which serves as a component of the sensor arrangement 4, is compared to the desired position of the float 8. A deviation between the actual position and the desired position is stored in the form of an offset value in a computing unit of the vehicle. At the same time it is provided that the fuel level indicator is corrected by taking into account the offset value. In this case, the following is valid for the offset: Offset=tank_desired−tank_actual, for example 8|−10|=−2|.

During the operation of the vehicle, a continuous correction is applied to the fuel level indicator, to which the following is applicable"

tank_corrected=tank_actual+offset, for example 10|+(−2|)=8|

However, in spite of such a calibration and although calibrations of this type are carried out, large tolerances must be provided because the system of the tank 2 and the sensor arrangement will be aging as operations are conducted, and it can change, for example as a result of expansion of tank 2. In addition, erroneous calibrations, which can be due for example to a float that is mounted in a high position or other system-related erroneous calibration, cannot be completely excluded.

Figure 2A:
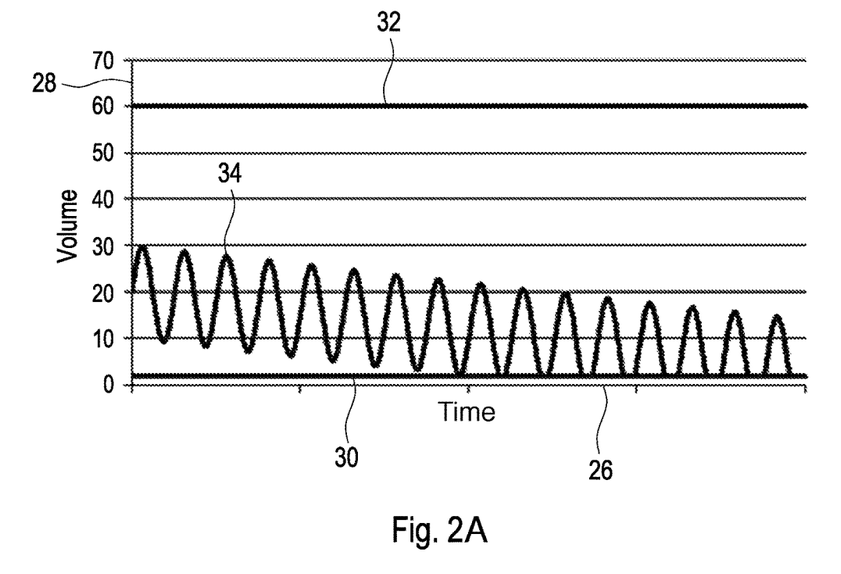
FIG. 2A shows a first diagram illustrating sensor signals that take into account the method according to the invention within the scope of an embodiment.
Figure 2B:
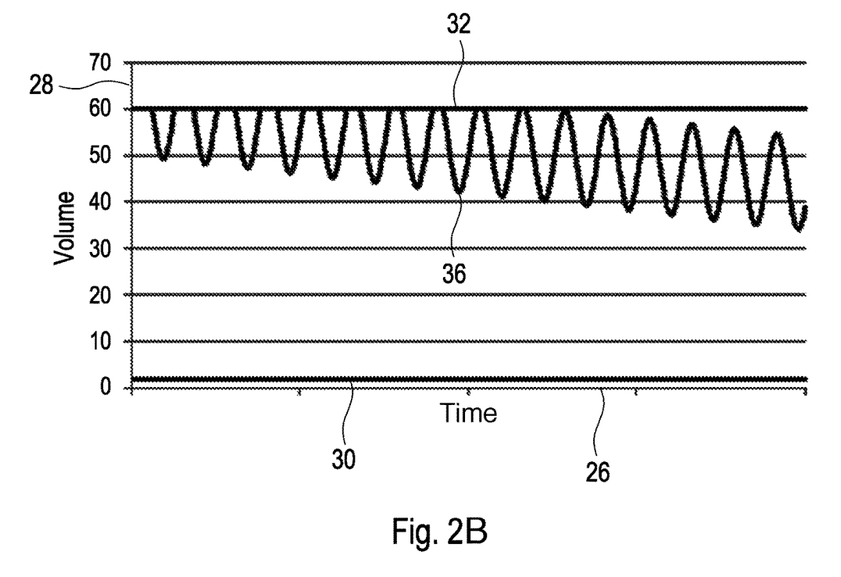
FIG. 2B shows a second diagram illustrating sensor signals that take into account the method according to the invention within the scope of an embodiment.

The diagrams shown in FIGS. 2a and 2b comprise respectively a horizontal axis 26 on which is plotted the time, and vertical axis 28 on which is plotted the volume of the liquid contained in the tank 2. Both diagrams include a first position line 30, which indicates a first value for a minimum value or a minimum volume of the liquid in the tank 2. A second position line 32 shown in the respective diagrams indicates a maximum amount or a maxim volume of the liquid in the tank 2. Furthermore, the curve shown in the diagram of FIG. 2a indicates a sensor signal 34 of the sensor arrangement 4 when the amount of the liquid in the tank 2 is over time gradually reduced to the minimum value (position line 30). The curve in the diagram of FIG. 2b shows the progress of the sensor signal 36 starting from a fully filled tank (position 32), wherein the amount of the liquid in the tank 2 is decreasing with the passage of time.

In this case, the curves of both sensor signals 34, 36, or both curves, are periodic and they have a trigonometric function, for example a sinusoidal function. At the same time, a real position of the float 8 as a component of the sensor system 4 inside the tank 2 is indicated by the sensor signals. FIG. 2a in this case shows that the progress of the sensor signal 34 becomes cut off the smaller the amount of the liquid that is contained in the tank 2. In this case, this indicates that with a respective sequence having a constant value for the progress of the sensor signal 34, the float 8 end stops at an inner wall or walling in the tank 2. Accordingly, the corresponding result is obtained for the sensor signal 36 in the diagram shown in FIG. 2b. As long as the amount of the liquid in the tank is large enough, the float 8 will be in this manner striking against the inner wall or walling of the tank 2, as a result of which sequence with constant values will be also obtained during the course of the sensor signal 36.

For an adaptive calibration of the fuel level indicator within the scope of the embodiment of the method, the tolerances of the sensor arrangement 4 of the tank 2 are thus detected, wherein a lower end stop is continuously detected (FIG. 2a), and also an upper end stop is continuously detected (FIG. 2b) for a measuring range by evaluating sequences having constant values. In this case, the fact the float 8 of the sensor arrangement 4 is exposed to the movement influences depending on the construction type and geometry of the tank 2 is also taken into account, which results in the sloshing movements of the float 7 as a component of the sensor arrangement 4, which are represented by the course of the sensor signals 34, illustrated in both diagrams shown in FIGS. 2a and 2b. Such an influence of the end stops on the course of a respective signal 34, 38 is used within the context of an analysis of this sensor signal 34, 36.

As the diagrams show, a change of the form of the course of the respective signal 34, 36 occurs with respect to an end stop of the float 8. In this case, a respective end stop can be identified based on a chronologically constant value the end stop 34, 35 of a course which is otherwise periodically changing. Such a change is therefore used as a signature for detecting the upper as well as the lower end stop.

Figure 3:
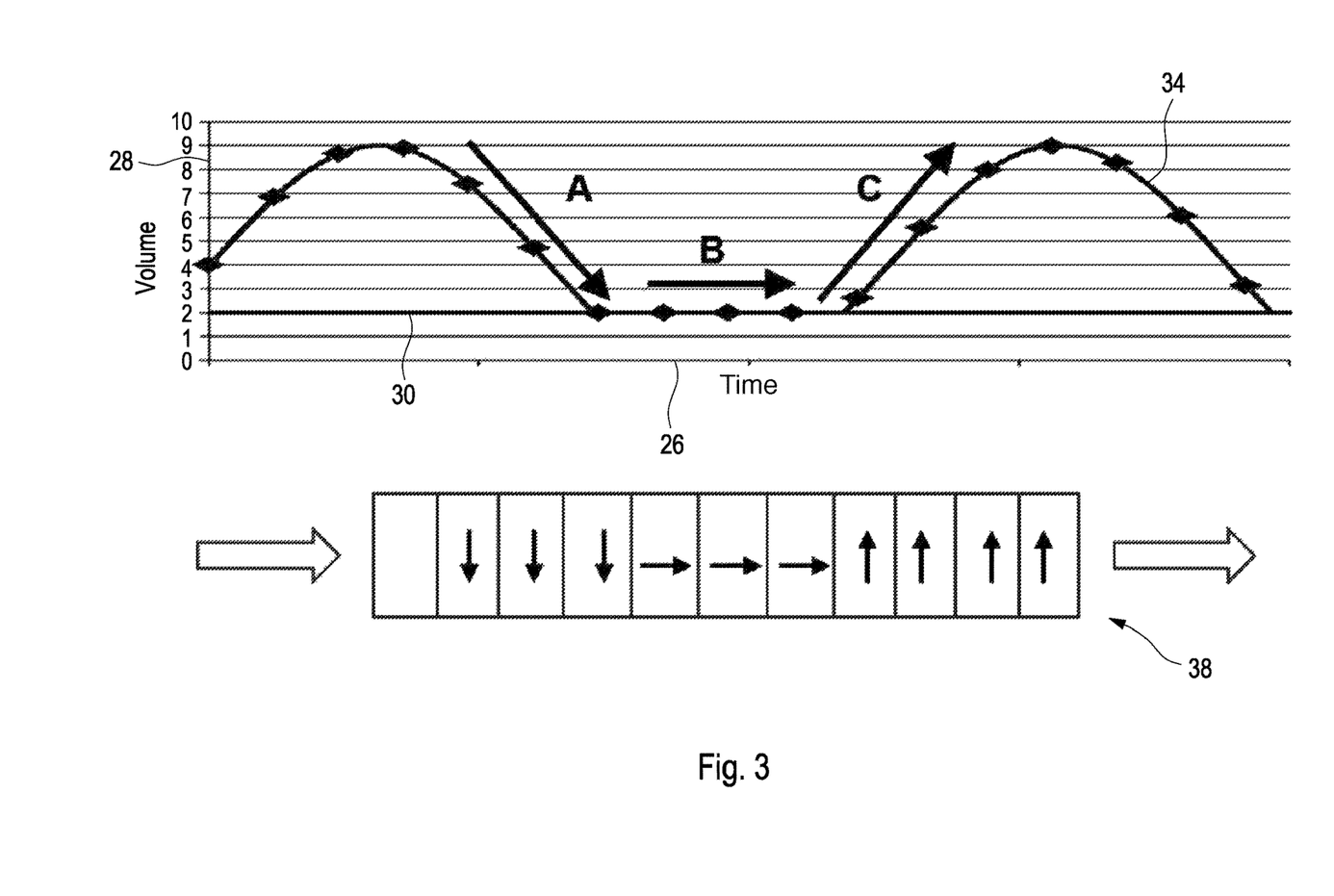
FIG. 3 shows a third diagram illustrating a sensor signal that takes into account the method according to the invention with an embodiment according to the invention.

The third diagram shown in FIG. 3 comprises a segment from the diagram of FIG. 2a, wherein this diagram also comprises a horizontal axis 28, on which is plotted the time, and a vertical 28, on which is plotted a volume or an amount of the liquid contained in the tank 2. The diagram shows on a detail in FIG. 3 one and half periods of the course of the sensor signal 34 of the diagram shown in FIG. 2a at a time when the amount of fuel in the tank 2 is still only small.

In addition, individual values measured during the course of the sensor signal 34 are indicated by rhomboid shapes that are indicated in the diagram, which are detected in regular time intervals by the sensor arrangement 4. The course of the sensor signal 34 is thus provided based on these individual values with the connected the rhomboid shapes which represent these values.

FIG. 3 also shows a result 38 of an evaluation logic, which is provided by a FIFO (first-in-first-out) module. In this case, one box is in this result 38 assigned to each value marked by a rhomboid shape.

An arrow A shown in the diagram indicates a sequence with a negative tendency of the sensor signal 34, which is illustrated in the result 38 by three arrows pointing downward. An arrow B shown in the diagram indicates that the sensor signal 34 displays a constant tendency, which is indicated by the sensor signal 34 with a constant value of the corresponding volume, in this case a minimum lower value (position line 30). In addition, the sensor signal 34 includes a sequence indicated by a third arrow C displaying a positive tendency, which is indicated in the result 38 by four boxes in which the arrows point upwards.

In this case it is provided the values of the sensor signal 34, represented by the rhomboid shapes, are digitally scanned regardless of the construction type of the sensor arrangement 4 that is used to indicate the filling level of the tank 2. In this case, a physical amount corresponding to a filling level is cyclically measured and mathematically converted into the filling level and thus into the sensor signal 34. As long as the course of the sensor signal 34 displays the lower constant value and the float 8 thus reaches an end stop, the course of the sensor signal 34 is constant for a certain period of time (sequence B) and thus remains unchanged. At the same time, a signature of the end stop, shown here in the empty region, can be described unambiguously based on the course of the sensor signal 34. The values of the digitally sampled sensor signal 34 are stored in the FIFO module, so that all the sample points or measured value are present in a limited time range in the FIFO module information. Logical operations are used for this time range as indicated by the result 38. Therefore, the FIFO module provides the negative tendency of the sequence A as evaluation logic via the result 8, the constant or unchanged or unavailable tendency of the sequence B, as well as the positive tendency that is provided with the sequence C.

At least one variable is taken into account when carrying out the method. In this case, a first possible characteristic is the duration of the sequences A, B, C, as well as the speed of the change of the sequences A and C, the amounts of change of the amplitude in the sequences A, B and C, and a sequence for the oscillation of the sensor signal 34. It is also necessary to consider which of the characteristics must be generally used depending on the geometry and/or form of the tank 2.

At the same time, it is possible to provide a minimum value for a duration of a respective sequence A, B, C. A minimum value can be also provided for changing the respective sequence A, B, C. This also applies to a respective amplitude of the sequence A and C, which among other things indicates a change of the filling level in liters. With respect to the sequences A and C, a gradient and thus also a temporal change or a change of the speed can be taken into account for the or for a respective minimum value. The named minimum values can also depend on the form of the tank 2. Thus it is among other options possible to distinguish a sloshing movement from a continuous movement based on an inclined position.

A corresponding diagram as well as a corresponding result is used for the sensor signal in the full range (FIG. 2b) within the context of the method as shown in FIG. 3, wherein the direction of the tendencies of the first sequence A and of the third sequence A are interchanged. However, a corresponding second sequence B is provided with a constant value, by means of which an end stop can be identified in the full range. The constant value in this case correspond to a maximum of the curve 36.

In addition, a single detected end stop is not evaluated as a final result because each end stop can be subject to at least one error. Therefore, a first error can result for example from a temporary curving of the wall, for example at the bottom of the tank 2. In addition, tolerances and thus also errors can occur as a result of the detection of measured values, which may be based for example on measurement tolerances, on an edgewise standing position of a float 8 and/or on mechanical tolerances. Moreover, a random sequence or signature can be also generated for an end stop at any filling level range.

Therefore, the detected end stops are mathematically and/or statistically evaluated and a solid calibration value is calculated from this evaluation. At the same time, a definable minimum number of end stops is taken into account within the context of the method, wherein this number depends on the geometry of the tank 2. As long as the number of the end stops is detected in the course of a respective sensor signal 34, 36, the constant values that are associated with each course of the sensor signal 34, 36 are counted as well as averaged. Moreover, the end stops detected at that time are assigned constant values that are arranged in a predetermined table and their number is counted. Furthermore, it is possible to arrange the end stops in a dynamic table and to count them. In this case, the respective end stop having an absolute value that is too far from the desired value range are discarded. Generally, the criteria that are taken into account within the scope of the method are a minimum number of end stop, a minimum measuring time period and/or a minimum measured distance traveled by the vehicle. These identified parameters or aspects can be also combined within the context of the method.

Figure 4:
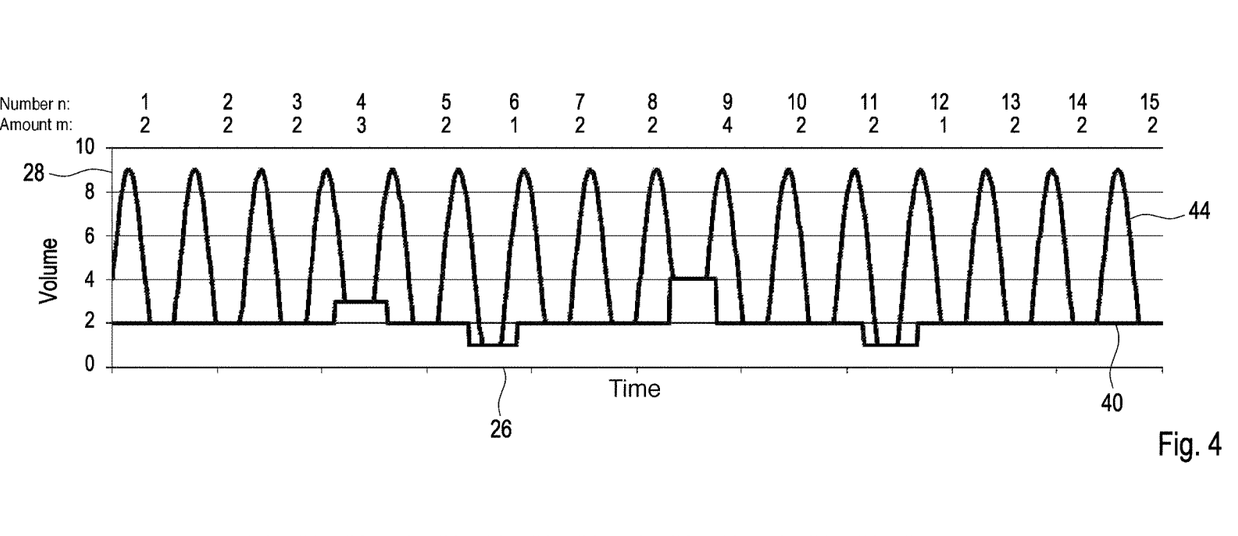
FIG. 4 shows a fourth diagram illustrating a sensor signal that takes into account the method according to the invention with an embodiment according to the invention.
Figure 5:
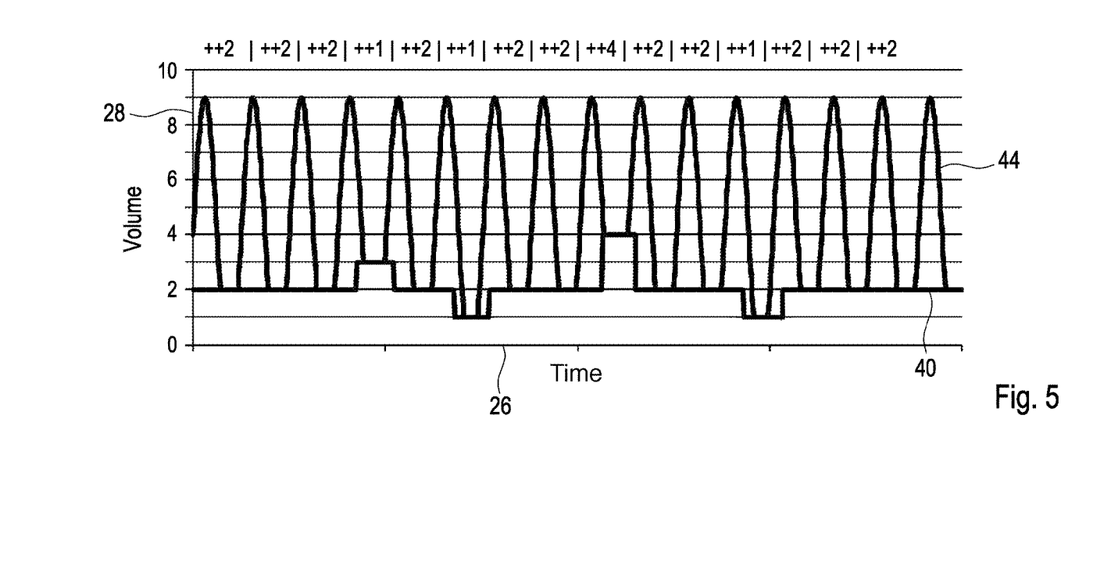
FIG. 5 shows a fifth diagram of illustrating a sensor signal that takes into account the method according to the invention with an embodiment according to the invention.

FIGS. 4 and 5 show respectively a diagram provided with a horizontal axis 26 on which are plotted the values corresponding to the time, as well as a vertical axis 28 on which are plotted values corresponding to the volume. The diagrams of FIGS. 4 and 5 comprise respectively a first position line 40 for end values of the volume of a lower end stop of the tank 2, as well as a periodic course or a periodic curve for a further signal 44 of the sensor arrangement 4. In this case, the curve for the sensor signal 44 is then in both diagrams always provided with constant values when the sensor signal 44 has values that are at the most as high as a respective end value. As a rule, the constant value or the end value is provided in most cases and therefore for most end stops with the value of 2 liters. However, the end value can deviate in some exceptions, so that the end value can correspond once to 3 liters, twice to one liter and once to 4 liters. The number n shown above the diagram shown in FIG. 4 indicates the number of respective end stops. The amount m indicates the respective constant value detected for the respective end stop. Above the diagram, symbols "++x", indicate a value of a counter, for example "++2", "++1", and "++4", by which the respective value is increased.

Within the context of the invention, the calibration value is determined by indicating the discreetly detected values for end stops. In this case, a fixed interval can be used for a determination. At the same time, an average value that is calculated from the constant values is declared to be valid as soon as the minimum anticipated number of end stop is registered by the sensor arrangement 4.

The end stops that are detected by the sensor arrangement 4 are counted and averaged based on the diagrams shown in FIG. 4.

With regard to the diagram of FIG. 4, the calibration value is obtained from the sum of the amounts m of the detected end values divided by the number n of the end stops: calibration value=sum (m)/n=2,067 liters. In this embodiment it is provided that the correct calibration value should correspond to 2 liters. However, it should be taken into account that the end stops, for which the end values m are obtained which do not equal 2 liters, are subject to errors and that they influence the averaging.

With respect to the diagram of FIG. 5 it is provided that the detected end stops are arranged in a predetermined Table 1 and counted.

TABLE 1

| Value Window | Frequency |
| --- | --- |
| >3 through 4 \| | 1 |
| >2 through 3 \| | 1 |
| >1 through 2 \| | 11 |
| >0 through 1 \| | 2 |
| >−1 through 0 \| | 0 |
| >−2 through −1 \| | 0 |
| >−3 through −2 \| | 0 |
| >−4 through −3 \| | 0 |

In the left column of the Table 1 are indicated possible ranges or intervals for the values or amounts m in a respective value window. In this case, the values in a respective value window can be arranged in a range of 3 through 4 liters, 2 through 3 liters, 1 through 2 liters, 0 through 1 liters, −1 through 0 liters, −2 through −1 liters, −3 through −2 liters, or a range from −4 through −3 litters. In the right column of the Table 1 is indicated the frequency of a range of values determined in a respective value window. In this case, Table 1 shows that a value between three to four liters as well as a value between two to three liters occurred a total of one times. A value between one to two litters occurred a total of eleven times. Furthermore, a value between zero up to one liter occurred a total of two times. In this case it is provided that the calibrated value corresponds to the most frequent statistically determined constant value of all end stops. At the same time, the correct calibrated value corresponds to here to two liters because a significant clustering of the end stop was determined at two liters.

In order to determine a relevant frequency of the end stops, it is also taken into account that a minimum absolute number or quantity of end stops must be reached. In addition, a significance must be defined for a value window or a class with the most end stops. When for example two frequencies of occurrences reach a similar quantity, the result is not representative, which means that a corresponding response must be provided. This means that the complete measurement is discarded. Furthermore, it is possible that two very similar clusters of values are averaged and preferences are derived in this manner for a lower or higher value window.

Furthermore, as was already indicated in FIG. 5, it is possible that within the context of the method, the end stops detected by the sensor arrangement 4 are arranged in a dynamic table and counted. In this case it is provided that intervals or ranges for value windows are provided in a dynamic manner for this dynamic table. This means that for the case when a first end stop occurs for example at 1.9 liters, an interval of ±0.5 liters is opened for this constant value, which then extends from 1.4 liters to 2.4 liters and which defines a possible range of a value window. In addition, there is a possibility to average out the intervals or discrete values within a respective range or value window, so that an average value is then used as a guiding variable for a determination of the interval and for a dynamic shifting of the boundaries of the interval. This makes it possible to ensure that the same frequencies will be avoided in adjacent classes, or value windows, or intervals.

After an evaluation of the provided minimum number of end stops, a calibration value is determined and used for the running time of the vehicle. Different embodiments can be provided in this case. It is possible to determine the calibration value only once during the service life of the vehicle. It is also possible to determine the calibration value continuously and to keep updating it. In this case, it is necessary to take into account the fact that the criteria for a first calibration value are different from the subsequent calibration value. So for example, it may occur that a small minimum number of end stops is required to obtain a first calibration faster. Moreover, a parallel displacement may be carried out for an already determined calibration value. It is also possible to change a gradient of a stored characteristic curve. In addition, a combination comprising the parallel displacement and the change of the gradient is also possible.

For processing the determined calibration value, the value is stored in a control device in order to control the method in a fixed manner and therefore in a non-volatile manner. In addition, the plausibility of the calibration value may be verified based on a predetermined minimum value or maximum value. The calibration value can be read out via a diagnostic module of the vehicle and indicated to the driver. It is further also possible to change the calibration value by means of a diagnosis, for example when the control device is changed, or to clear the control device when changing the tank 2.

If errors occur, they can be stored in a fault memory. This is for example the case when a calibration value cannot be formed over a defined distance traveled by the vehicle after a specified period of time has elapsed, or when the plausibility limits are violated. Optionally, it is also possible to transmit by radio a determined calibration value to a Connect service and thus to a central stationary unit, which detects and manages and/or processes calibration values from a plurality of vehicles and which can contain current statistics of tolerances. It is thus also possible to identify possible deviations and point them out within the context of an early warning system for quality improvement purposes.

The described embodiment of the method for adaptive calibration of the fuel level indicator makes it possible to reduce the burden on the actual production of the vehicle and to avoid disturbances in the production process. In addition, the quality of the calibration as well as the quality of the fuel level indicator can be also improved. It is thus also possible to avoid complaints due to erroneous calibration. The driver may find out that the available volume of the tank 2 can be better used due to smaller reserves. It is also possible to react to fluctuations of the tank 2 and of the sensor arrangement 4 by means of the adaptive, operational calibration of the fuel level indicator during the service life of the system. It is also possible to continuously evaluate the tolerance data through the Connect service.

The described method can be used to carry out measurements of the filling levels of different liquids that can be stored in the tank 2 of the vehicle. So for example, the method can be applied to liquid fuel that is used to driving the vehicle, or to brake liquid, liquid refrigerant, urea (AdBlue) used for an exhaust system, or a liquid that is used for cleaning at least one window of the motor vehicle and/or for engine oil.

Figure 6A:
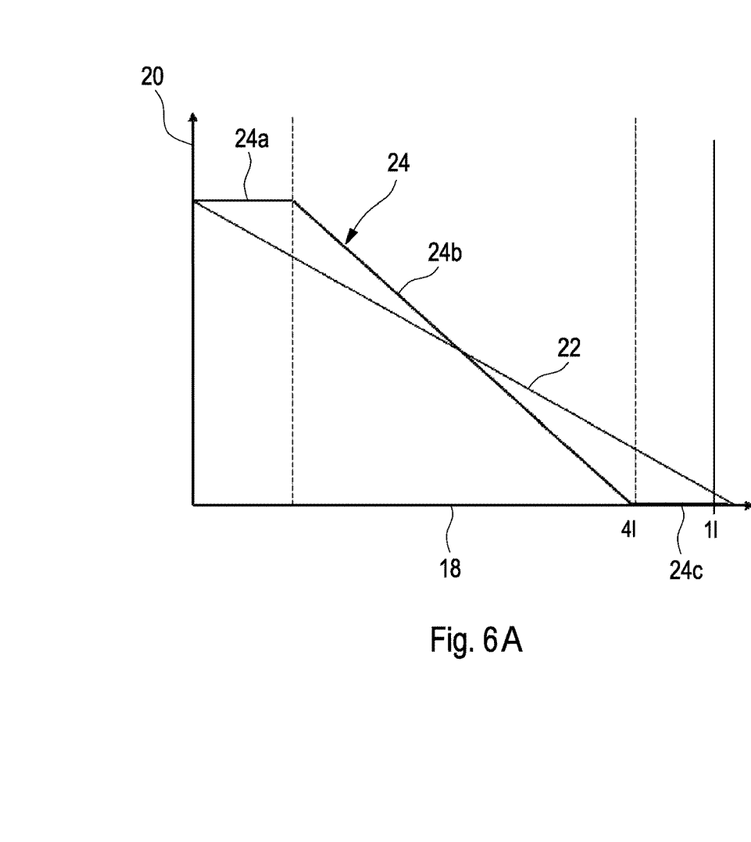
FIG. 6A shows a sixth diagram that takes into account the method according to the invention for carrying out an embodiment thereof.
Figure 6B:
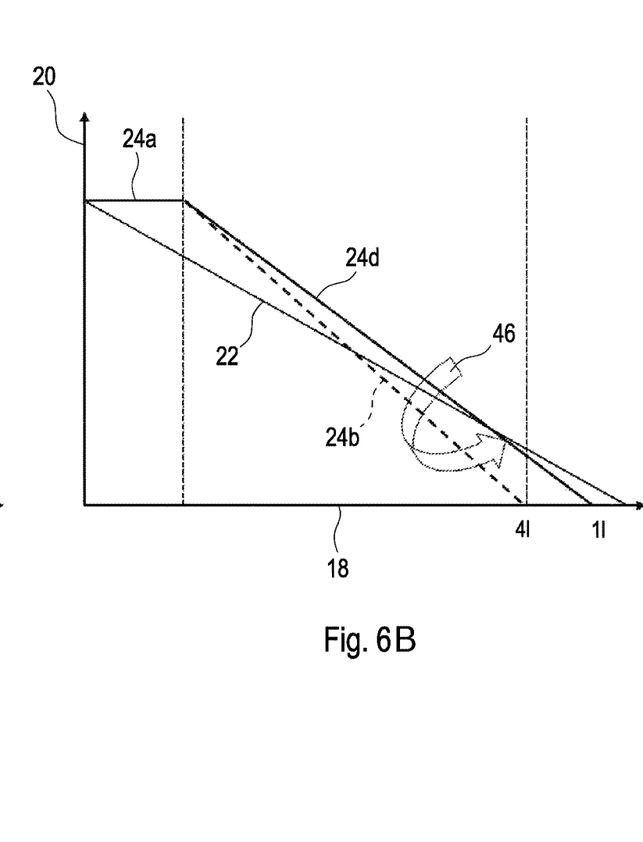
FIG. 6B shows a seventh diagram that takes into account the method according to the invention for carrying out an embodiment thereof.

Both diagrams shown in FIGS. 6a and 6b are based on the diagram of FIG. 1, wherein the diagram of FIG. 6a mostly shows the same aspects as those of the diagram that is shown in FIG. 1. As illustrated by the diagram in FIG. 6a, the fuel level indicator shows that the tank is empty as soon as the amount of liquid reaches at the most four liters. After the method has been carried out, an end stop and thus an actual empty value of one liter is determined during the running time of the vehicle. Therefore, the result is that it is possible to reduce with precision the empty value from four liters to one liter after the method has been carried out.

As shown in the diagram of FIG. 6b by a curved arrow 48, the section 24b of the curve 24 shown here by dotted lines is shifted to an updated section 24d and it shows an optimal course after carrying out an adaptive calibration phase. The result is that the empty value after carrying out the method is reduced from four liters to one liter.

Figure 7:
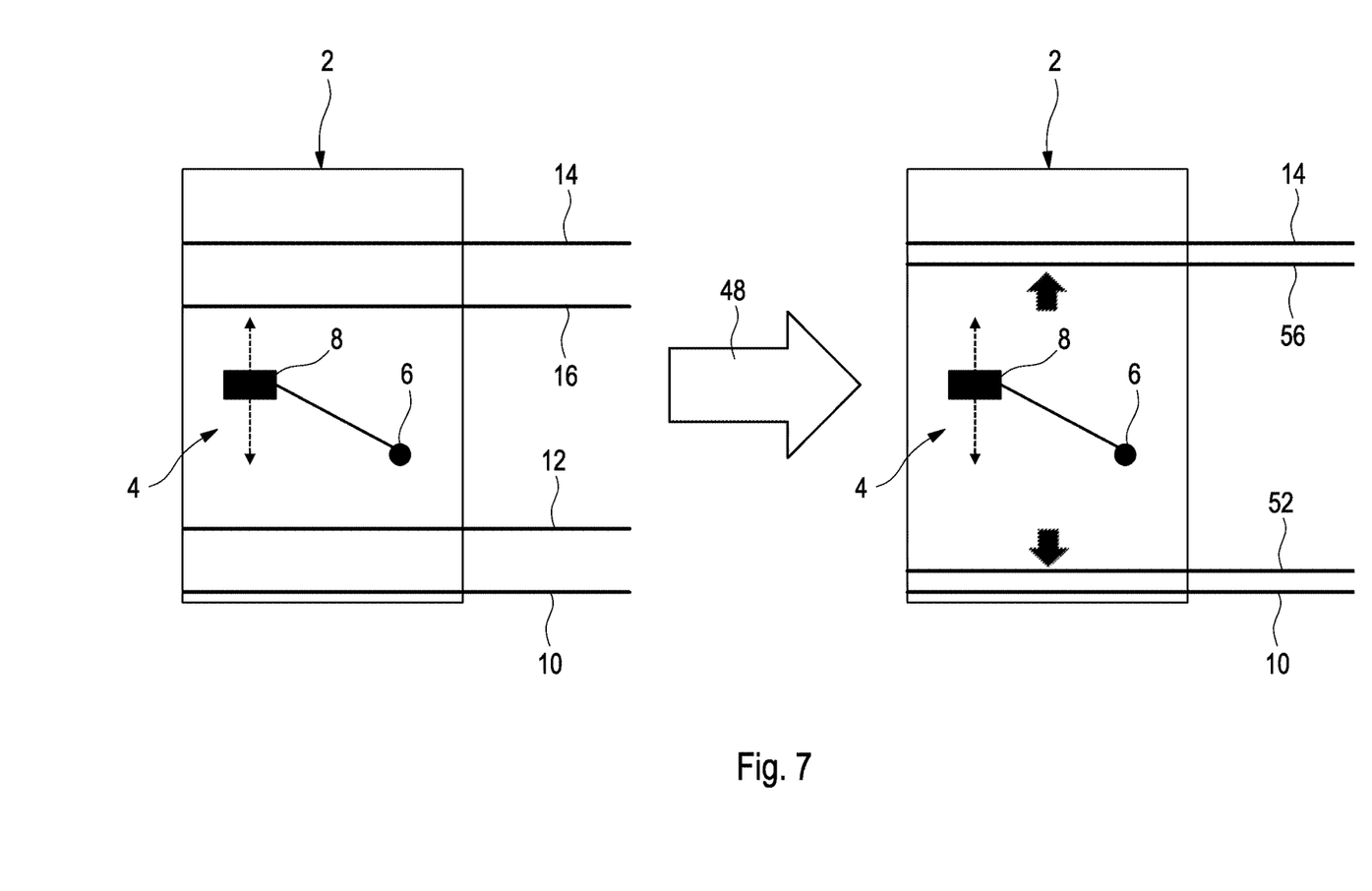
FIG. 7 shows the tank of FIG. 1 and the diagram illustrating the fuel level indicator of this tank adapted within the scope of the method according to the invention.

FIG. 7 shows on the left side of the figure the system of the tank 2 that has already been described in FIG. 1, as well as the sensor arrangement 4. When the method is carried out, as indicated by an arrow 48, the position line 12 is shifted downward to a position line 52 and the position line 16 is shifted upward to a position line 56.

Accordingly, FIG. 7 shows that at delivery of the vehicle, an initial application of the fuel level indicator is realized, wherein sufficient tolerances are determined for the fuel level indicator, as well as stored and registered. After that, during the use of the vehicle, at least one calibration phase is carried out for the adaptive calibration of fuel level indicator during the operation of the vehicle. In this case, the sensor signals 34, 36, 44 of the sensor arrangement 4 are continuously evaluated for the fuel level indicator of the filling level of the tank 2. At the same time, the system of tank 2 and the sensor arrangement 4 can be continuously adapted to given tolerances, wherein the work points or position lines 12, 16, 30, 32 are adapted to the full tolerance range, so that the float 8 causes end stops in the full range at an upper section of the inner wall of the tank 2, and to the empty tolerance range, in which the float causes end stop in the empty range at a lower section of the inner wall of the tank 2, as the fuel level indicator is shifted to the position line 52 or 56. A similar shift is determined on the basis of the calibrated values within the scope of the method.

The invention claimed is:

1. A method for carrying out an adaptive calibration of a fuel level indicator of a filling level of a liquid accompanying the operations in a tank of a vehicle, comprising:

detecting a filling level of the liquid is detected with a sensor arrangement, wherein a sensor signal of the sensor arrangement has a periodic course during the movement of the vehicle, wherein in the case that the course of the sensor signal occurs in a respective defined time interval in which the sensor signal is provided several times, a constant value is assumed, and an end stop is detected, wherein the respective time intervals at which the end stops are detected are stored as the respectively associated constant values, wherein a minimum number of end stops is defined for the tank, wherein in the case that the minimum number of end stops is reached, a calibration phase is carried out, in which the constant values resulting from the end stops are statistically evaluated; and calibrating the display of the filling level utilizing these values.

2. The method according to claim 1, wherein the filling level of the liquid is detected with a sensor arrangement, which includes a float as at least one component which swims on the surface of the liquid, wherein the resulting sensor signal is provided by the sensor arrangement from a position of the float inside the tank, wherein the sensor signal is provided with a periodic course during a movement of the vehicle, and wherein in the case that the float touches an inner wall of the tank, an end stop is caused on the inner wall.

3. The method according to claim 1, which is carried out at least for one end region filling level, wherein a first end region corresponds to an empty region of the filling level when the constant values of the course of the sensor signal are less than a definable minimum value, wherein a second end region corresponds to a full region of the filling level when the constant values of the course of the sensor signal are more than a definable maximum value, wherein at least one calibration phase is carried out for each end region.

4. The method according to claim 1, wherein an average value is calculated from all the constant values that have resulted in end stops, and is used for a calibration value.

5. The method according to claim 1, wherein a plurality of value windows is defined for the constant values which cover a region of the filling level, wherein each value window is limited by a maximum value and by a minimum value, wherein a reference value is assigned to each value window, wherein each respective detected end stop is assigned to a value window based on the constant value that is assigned to it, and wherein as a calibration value is used the reference value of the value window in which most constant values occur.

6. The method according to claim 1, wherein a frequency and an amplitude of the course of the sensor signal are used to identify an end stop.

7. The method according to claim 1, wherein the calibration value is updated after each performed calibration.

8. The method according to claim 1, wherein the calibration value is used as an offset for the fuel level indicator, wherein the value of the filling level indicated by the fuel level indicator results from the value of the sensor signal that has been detected by the sensor arrangement, plus or minus the offset.

9. The method according to claim 1, wherein an original calibration value is determined based on a known amount of liquid in the tank.

10. The method according to claim 1, which is carried out for a tank which can be filled with a liquid that is consumed during the operation of the vehicle and with which the tank is refilled.

* * * * *